United States Patent
Wang et al.

(10) Patent No.: US 12,172,921 B2
(45) Date of Patent: Dec. 24, 2024

(54) DEVICE AND METHOD FOR ADJUSTABLE HEAT DISSIPATION IN CHANNEL COOLING SECTION

(71) Applicant: CAIHONG DISPLAY DEVICES CO., LTD., Shaanxi (CN)

(72) Inventors: Dacheng Wang, Xianyang (CN); Menglong Wang, Xianyang (CN); Wei Yang, Xianyang (CN)

(73) Assignee: CAIHONG DISPLAY DEVICES CO., LTD., Xianyang (CN)

( * ) Notice: Subject to any disclaimer, the term of this patent is extended or adjusted under 35 U.S.C. 154(b) by 0 days.

(21) Appl. No.: 18/525,758

(22) Filed: Nov. 30, 2023

(65) Prior Publication Data

US 2024/0092675 A1    Mar. 21, 2024

Related U.S. Application Data

(63) Continuation-in-part of application No. PCT/CN2023/084874, filed on Mar. 29, 2023.

(30) Foreign Application Priority Data

Mar. 30, 2022   (CN) .......................... 202210327147.6

(51) Int. Cl.
*C03B 18/18*    (2006.01)
(52) U.S. Cl.
CPC .................................. *C03B 18/18* (2013.01)
(58) Field of Classification Search
None
See application file for complete search history.

(56) References Cited

U.S. PATENT DOCUMENTS

| | | | |
|---|---|---|---|
| 6,286,337 B1 | 9/2001 | Palmquist | |
| 10,011,511 B2* | 7/2018 | Kersting | ................... C03B 7/02 |
| 2011/0113827 A1* | 5/2011 | De Angelis | ............... C03B 7/07 |
| | | | 65/181 |
| 2016/0185643 A1* | 6/2016 | Kersting | ................. C03B 17/02 |
| | | | 65/195 |

(Continued)

FOREIGN PATENT DOCUMENTS

| CN | 206438024 U | 8/2017 |
|---|---|---|
| CN | 207451919 U | 6/2018 |

(Continued)

OTHER PUBLICATIONS

International Search Report in PCT/CN2023/084874 mailed on Jul. 29, 2023, 7 pages.

(Continued)

*Primary Examiner* — Jodi C Franklin
(74) *Attorney, Agent, or Firm* — PORUS IP LLC

(57) ABSTRACT

A device and method for adjustable heat dissipation in a channel cooling section are provided. The device for heat dissipation may include: a plurality of flat tubes arranged adjacent to each other inside the channel cooling section. Each of the flat tubes may be surrounded by a heater on an outer ring. A side insulation structure may be provided on both sides of each of the flat tubes, and a top insulation structure may be provided at a top of each of the flat tubes. The method for heat dissipation may include performing a first disassembly on the each section of flat tube one by one in sequence.

8 Claims, 4 Drawing Sheets

(56) References Cited

U.S. PATENT DOCUMENTS

2016/0281357 A1* 9/2016 Aribas ............... E04B 2/44
2021/0347668 A1* 11/2021 De Angelis ........... C03B 5/225

FOREIGN PATENT DOCUMENTS

| | | |
|---|---|---|
| CN | 109320053 A | 2/2019 |
| CN | 109455903 A | 3/2019 |
| CN | 110451780 A | 11/2019 |
| CN | 210567009 U | 5/2020 |
| CN | 212334992 U | 1/2021 |
| CN | 112624573 A | 4/2021 |
| CN | 112668214 A | 4/2021 |
| CN | 114716137 A | 7/2022 |
| DE | 10223606 A1 | 12/2003 |

OTHER PUBLICATIONS

Written Opinion in PCT/CN2023/084874 mailed on Jul. 29, 2023, 7 pages.
First Office Action in Chinese Application No. 202210327147.6 mailed on Apr. 22, 2023, 13 pages.
The Second Office Action in Chinese Application No. 202210327147.6 mailed on Oct. 19, 2023, 15 pages.
Notification to Grant Patent Right for Invention in Chinese Application No. 202210327147.6 mailed on Jan. 16, 2024, 4 pages.
The Second Office Action in Chinese Application No. 202210327147.6 mailed on Oct. 19, 2023, 16 pages.

\* cited by examiner

DEVICE AND METHOD FOR ADJUSTABLE HEAT DISSIPATION IN CHANNEL COOLING SECTION

CROSS-REFERENCE TO RELATED APPLICATION

This application is a Continuation-in-part of International Application No. PCT/CN2023/084874, filed on Mar. 29, 2023, which claims priority of Chinese Patent Application No. 202210327147.6, filed on Mar. 30, 2022, the contents of each of which are entirely incorporated herein by reference.

TECHNICAL FIELD

The present disclosure relates to the technical field of substrate glass manufacturing, and in particular to a device and method for adjustable heat dissipation in channel cooling section.

BACKGROUND

A cooling section is one of the key portions in a channel device, which mainly serves a purpose of uniformly and rapidly cooling a high-quality glass melt, so that the glass melt may reach a state that meets conditions of a molding process within a limited period of time. Due to a special structure and function of the cooling section, a flat tube structure may be designed to enhance a cross-section heat dissipation, and refractory bricks of different materials may be matched on an exterior of the flat tube structure to realize a rapid and stable cooling in this area.

With a gradual improvement of an efficiency of a substrate glass production, when other components meet a condition, a heat dissipation ability of the existing device may be challenged when there is a great flow of the glass melt due to the cooling section, that is, a heating power of the cooling section on the area has been reduced to a lowest point, but is still unable to guarantee a higher level of heat dissipation. As the power is close to a lower limit, a function of the cooling may have a risk of lose control.

Accordingly, there is a need to provide a device and method for adjustable heat dissipation in channel cooling section, so as to realize a heat dissipation adjustment of the cooling section to meet a heat dissipation requirement.

SUMMARY

One or more embodiments of the present disclosure provide a device for adjustable heat dissipation in a channel cooling section, including a plurality of flat tubes arranged adjacent to each other inside the channel cooling section. Each of the flat tubes may be surrounded by a heater on an outer ring. A side insulation structure may be provided on both sides of each of the flat tubes, and a top insulation structure may be provided at a top of each of the flat tubes. The side insulation structure may include a side outer insulation component, a side clamping component, and a side inner insulation component. One side of the side inner insulation component may be matched and fitted to a side of a flat tube, the other side of the side inner insulation component may be fitted to the side outer insulation component, and the side clamping component may be provided at each of two ends of the side inner insulation component. The top insulation structure may include a top insulation component disposed at a top of the flat tube, and top clamping components disposed at each of two ends of the top insulation component.

One of the embodiments of the present disclosure provides a method for heat dissipation of a device for adjustable heat dissipation in a channel cooling section. The device may include: a plurality of flat tubes arranged adjacent to each other inside the channel cooling section. Each of the flat tubes may be surrounded by a heater on an outer ring. A side insulation structure may be provided on both sides of each of the flat tubes, and a top insulation structure may be provided at a top of each of the flat tubes. The side insulation structure may include a side outer insulation component, a side clamping component, and a side inner insulation component. One side of the side inner insulation component may be matched and fitted to a side of a flat tube, the other side of the side inner insulation component may be fitted to the side outer insulation component, and the side clamping component may be provided at each of two ends of the side inner insulation component. The top insulation structure may include a top insulation component disposed at a top of the flat tube, and top clamping components disposed at each of two ends of the top insulation component. Based on the aforementioned adjustable device for heat dissipation, the method may include the following operations: performing a first disassembly on the each of the flat tubes one by one in sequence, the first disassembly including loosening the side clamping components at both ends of the side inner insulation component, removing the top insulation component and the side outer insulation component of the flat tube in sequence, and then fixing the side clamping components again, to realize a first disassembly heat dissipation of the channel cooling section.

BRIEF DESCRIPTION OF THE DRAWINGS

The present disclosure will be further illustrated by way of exemplary embodiments, which will be described in detail with reference to the accompanying drawings. These embodiments are not limiting. In these embodiments, the same numbering indicates the same structure, wherein.

DETAILED DESCRIPTION

Figure 1:
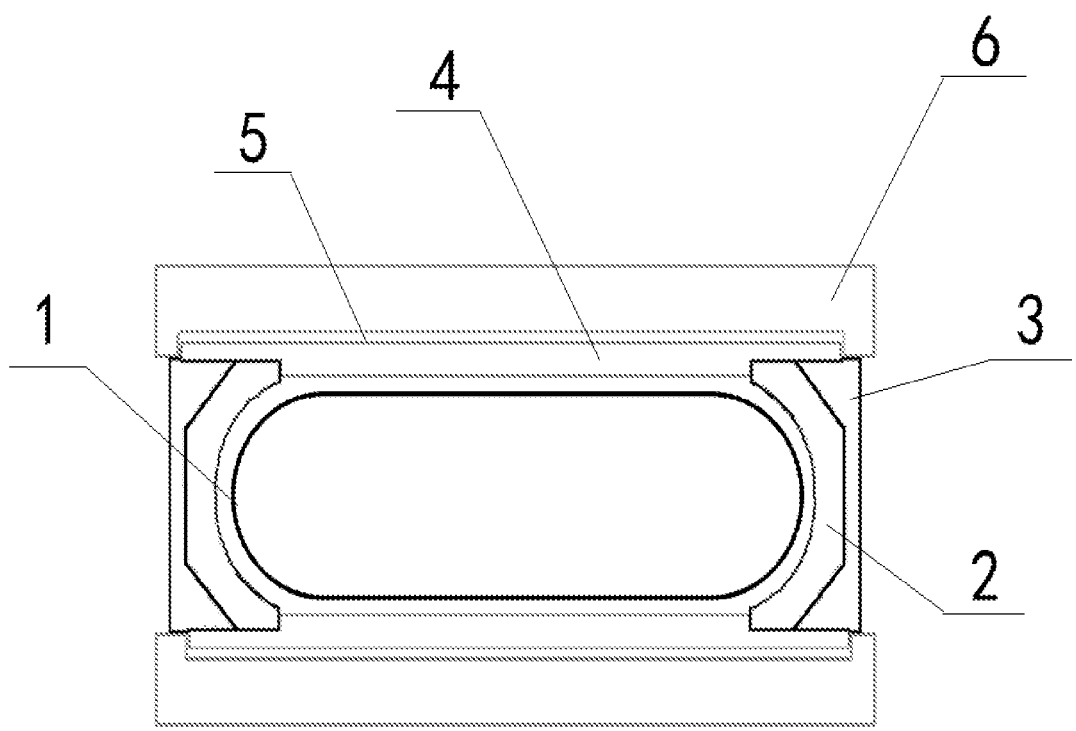
FIG. 1 is a schematic diagram illustrating a cross-section of a device for adjustable heat dissipation in a cooling section according to some embodiments of present disclosure.

To further illustrate the technical solutions of the embodiments of the present disclosure, the accompanying drawings used in the description of the embodiments will be briefly introduced below. Obviously, the accompanying drawings in the following descriptions are only some examples or embodiments of the present disclosure. A person of general skill in the art may apply the present disclosure to other similar scenarios based on these accompanying drawings without creative labor. Unless obviously obtained from the context or otherwise illustrated, the same numeral in the drawings refers to the same structure or operation.

It should be understood that the terms "system", "device", "unit" and/or "module" are used herein to distinguish between different components, elements, portions, sections, or assemblies at different levels. However, the words may be replaced by other expressions if the same purpose is able to be achieved by other words.

As shown in the present disclosure and the claims, unless the context clearly suggests otherwise, the words "one," "a," "a kind of," and/or "the" do not specifically refer to the singular form, but may also include the plural form. In general, the terms "including" and "comprising" only suggest the inclusion of clearly identified operations and elements, which do not constitute an exclusive list, and the method or device may also include other operations or elements.

A substrate glass belongs to a high temperature industry, and a platinum channel may be one of key devices for clarifying and homogenizing a high temperature glass melt and regulating a temperature, in which a cooling section belongs to an end process area of the platinum channel. The cooling section may mainly play a role of cooling and flow regulation, etc.

FIG. 1 is a schematic diagram illustrating a cross-section of an adjustable heat dissipation device in a cooling section according to some embodiments of present disclosure.

In some embodiments, as shown in FIG. 1, a device for adjustable heat dissipation in the channel cooling section may include a plurality of flat tubes arranged adjacent to each other inside the cooling section. The flat tube 1 may be a tube with a flat cross-section that is able to effectively dissipate heat from the glass. The flat tube 1 may be made of a metal material with good and stable heat dissipation properties, such as platinum, aluminum, etc. In some embodiments, a heater may be provided around an outer ring of the flat tube 1, and a side insulation structure 3 may be disposed on both sides of each of the flat tube 1, and a top insulation structure 5 may be disposed at a top of each of the flat tube 1.

The heater may provide a lower heat output to an inner high temperature glass melt, allowing for different rates of cooling of the inner high temperature glass melt. In some embodiments, a rate of heat dissipation of the glass melt may be increased when a heater power is decreased, and the rate of heat dissipation may be decreased when the heater power is increased. Exemplary heaters may include heating pads, heating wires, etc. One or more heaters may be disposed according to requirements.

Figure 2:
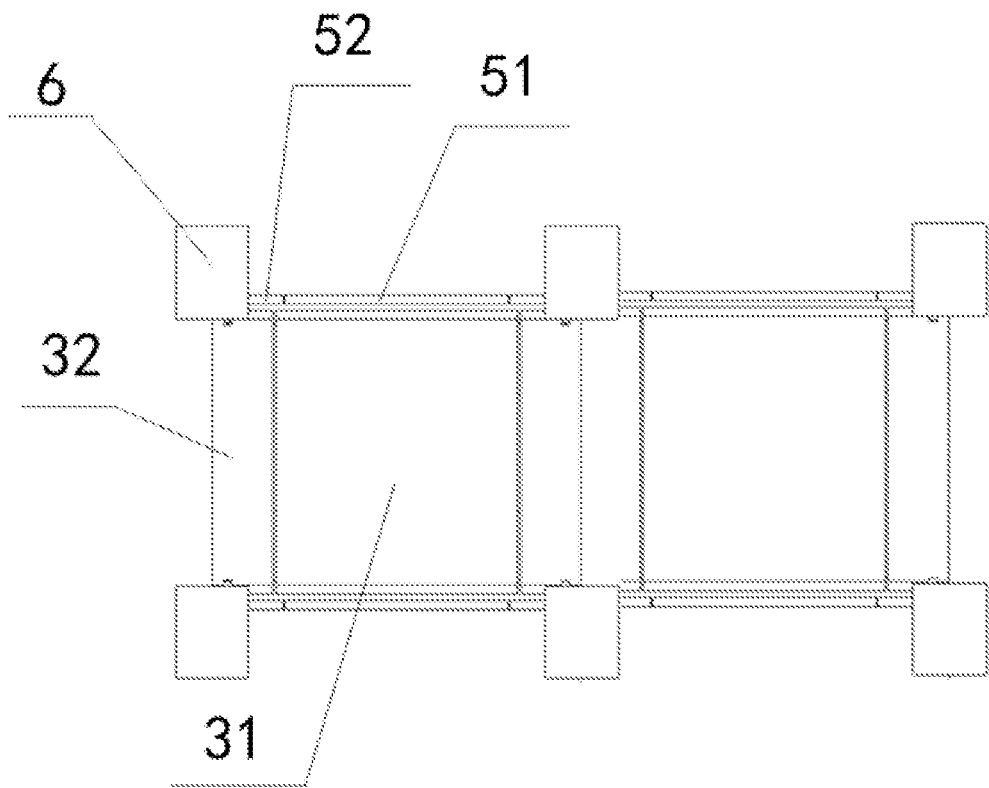
FIG. 2 is a schematic diagram illustrating a side portion of a plurality of flat tubes of a cooling section according to some embodiments of the present disclosure.
Figure 3:
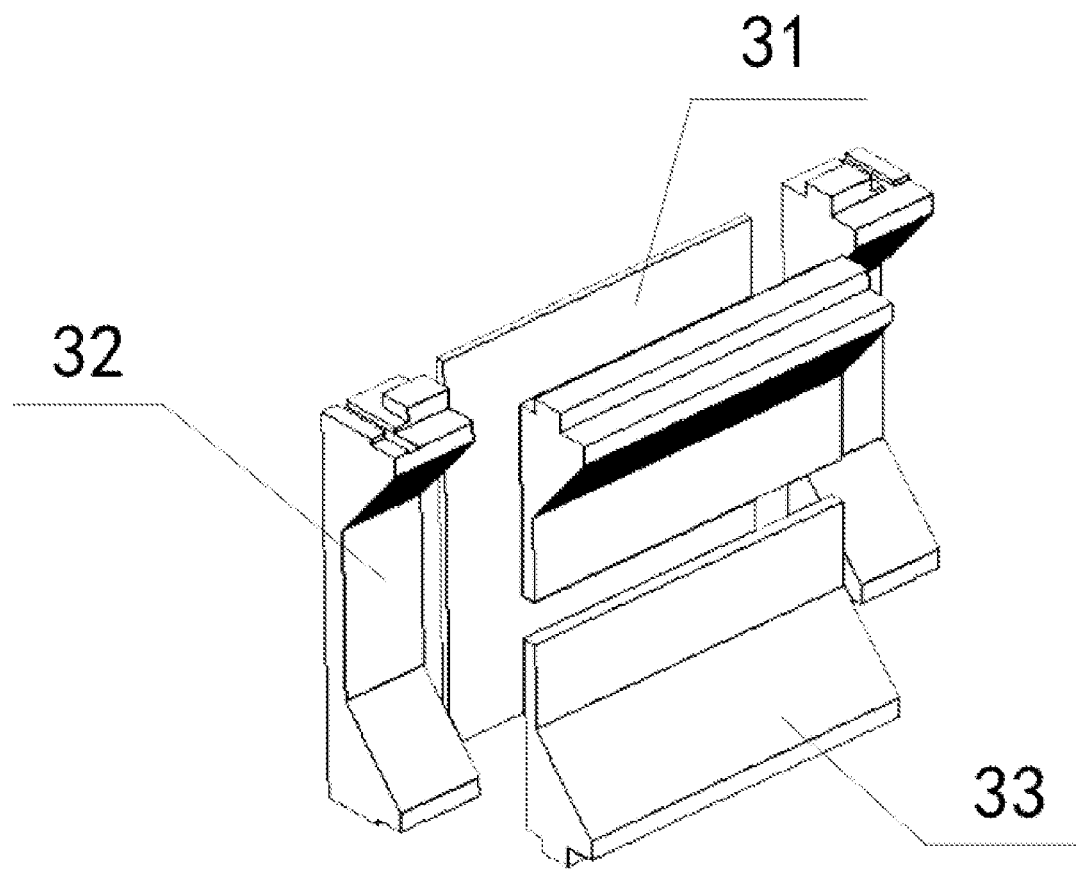
FIG. 3 is a schematic diagram illustrating a side insulation structure of a cooling section according to some embodiments of the present disclosure.

FIG. 2 is a schematic diagram illustrating a side portion of a plurality of flat tubes of a cooling section according to some embodiments of the present disclosure. FIG. 3 is a schematic diagram illustrating a side insulation structure of a cooling section according to some embodiments of the present disclosure. In some embodiments, as shown in FIGS. 2 and 3, the side insulation structure 3 may include a side outer insulation component 31, a side clamping component 32, and a side inner insulation component 33. One side of the side inner insulation component 33 may be matched and fitted to a side of the flat tube 1, and the other side of the side inner insulation component 33 may be fitted to the side outer insulation component 31. The side clamping component 32 may be provided at each of two ends of the side inner insulation component 33.

Figure 4:
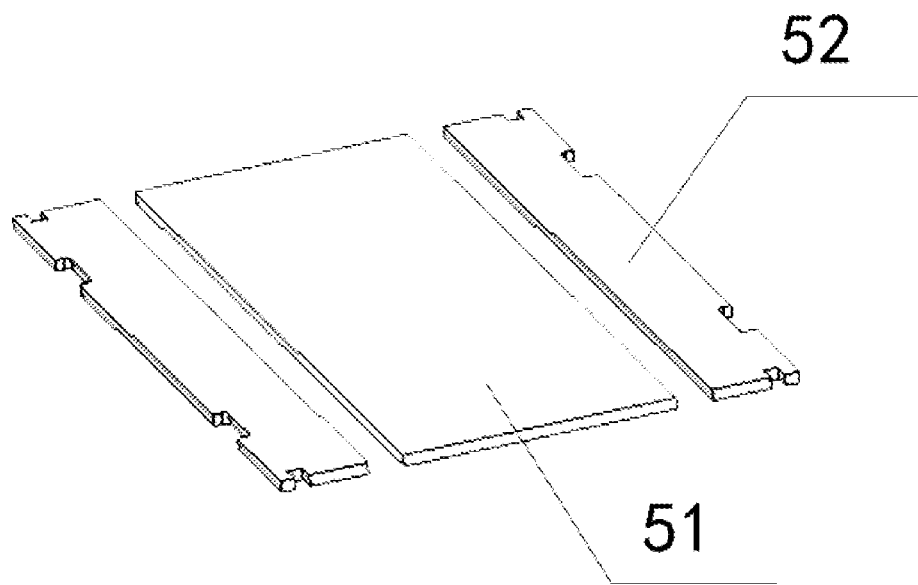
FIG. 4 is a schematic diagram illustrating a top insulation structure of a cooling section according to some embodiments of the present disclosure.

FIG. 4 is a schematic diagram illustrating a top insulation structure of a cooling section according to some embodiments of the present disclosure. In some embodiments, as shown in FIGS. 2 and 4, the top insulation structure 5 may include a top insulation component 51 disposed at a top of the flat tube 1 and a top clamping component 52 disposed at each of two ends of the top insulation component 51.

In some embodiments, by dividing the insulation structure into the side insulation structure 3 disposed at the two ends of the cooling section flat tube 1 and the top insulation structure 5 disposed at the top of the cooling section flat tube 1, and at the same time, by splitting the side insulation structure 3 with three components together, a structure that is able to match and fit with the two ends of the cooling section flat tube 1 may be formed for insulation. Meanwhile, when a heat dissipation is performed, the side insulation structure 3 may be disassembled to achieve an adjustable heat dissipation. The top insulation structure 5 may consist of two components, which is able to ensure the insulation of the top of the cooling section flat tube 1 and achieve a removable and adjustable heat dissipation. In addition, the side insulation structure 3 and the top insulation structure 5 may both be provided with the side clamping component 32, which is helpful for an external mechanical component for clamping, and further helps to achieve a disassembly of the insulation structure. Through designing a modular cooling section insulation structure, not only the clamping and fixing function of the external mechanical structure on an overall structure may be satisfied, so as to ensure a basic safety and reliability of the device, but also a rapid disassembly of a local insulation material may be implemented. By changing a form of the insulation structure, a heat dissipation level may be adjusted. Combined with a synchronous matching adjustment on power, a heat dissipation of the cooling section may be greatly improved, thereby ensuring the safety and reliability of a flow enhancement, providing a key technical support for increasing a production line capacity.

In some embodiments, as shown in FIG. 1, a basic cross-section structure of the cooling section may include the flat tube 1 inside the cooling section, the side insulation structure 3, a heater, the top insulation structure 5, and an embossed brick 6. The heater may include an upper heater 4 provided at an upper portion of the flat tube 1 and a lower heater 4 provided at a lower portion of the flat tube 1, and at least one side heater 2 provided on at least one side of the flat tube 1. In some embodiments, the heater may be disposed around the flat tube 1 on an innermost layer, and the insulation structure may be disposed on an outer layer. The insulation bricks in four directions may be fixed and supported by the embossed bricks 6. The mechanical structure at the outermost may act on the embossed bricks 6 and the side insulation structure 3 to implement a safe and stable operation of the overall structure.

In some embodiments, the insulation structure may be considered as a core portion of a device for heat dissipation. The insulation structure may include the side insulation structure 3 as well as the top insulation structure 5, both of which are designed in different shapes to satisfy the clamping structure. Exemplarily, the top insulation structure 5 may adopt a flat plate structure, and the side insulation structure 3 may adopt a U-shape structure to ensure that an outer surface is planar structure to provide a clamping surface of the mechanical structure. The insulation structure may also adopt other structures capable of satisfying clamping requirements.

In some embodiments, the insulation structure, together with an internal heater, may form an integral module, and the device for heat dissipation may include a single module or may be formed by an array of identical modules butted together. Due to a long structure of the cooling section, by adopting a plurality of identical modules, a problem that parts of a single module are difficult to process directly may be solved. In some embodiments, due to the need to achieve an online disassembly and installation, as shown in FIG. 2, for a side portion, an actual mechanical clamping structure may act on an area where two modules are connected. Therefore, some embodiments of the present disclosure may adopt a split structure of the side insulation structure 3. For a top portion, the actual mechanical clamping structure may directly act on a section of area between adjacent top insulation structures 5 through the embossed brick 6.

Exemplarily, a split structure of the side insulation structure 3, shown in FIG. 3, may be divided into 5 portions, which mainly consists of three parts, namely the side outer insulation component 31, the side clamping component 32, and the side inner insulation component 33. They may be made of the same material as the flat tube 1, for example, an aluminum insulation material with high thermal conductivity may be adopted. The above three parts, totaling 5 elements, may be splice together to form a complete side U-shape insulation structure for insulating a side area.

Exemplarily, a disassembled structure of the top insulation structure 5, as shown in FIG. 4, may be divided into 3 portions, and may mainly consist of two parts, namely, the top insulation component 51 and the top clamping component 52. The two parts may be made of the same material as the flat tube 1, for example, the aluminum material with higher thermal conductivity may be adopted.

In some embodiments, both the side insulation structure 3 and the top insulation structure 5 may be heat insulation bricks, for example, both the side insulation structure 3 and the top insulation structure 5 may be made of high alumina heat insulation bricks.

In some embodiments, there may be a butt joint between the top clamping components 52 at the top of the two adjacent flat tubes, and the butt joint may be provided with the embossed brick 6 that act directly on an area of the butt joint between the two adjacent flat tubes for securing the top insulation structure 5 at the top of the flat tube 1.

In some embodiments, the flat tube 1 may be an integrated structure. In some embodiments, the flat tube 1 may be formed by a combination of various portions. For example, the flat tube 1 may include a flat tube top plate and a flat tube bottom plate, the flat tube top plate may be arched, and the flat tube bottom plate may be a flat plate with both sides being bent upwardly and welded to the flat tube top plate to form the flat tube 1.

In some embodiments, the side inner insulation component 33, the side clamping component 32, and the side outer insulation component 31 may be spliced together to form the U-shape structure. A curvature of the U-shape structure may match a curvature of two sides of the flat tube 1.

In some embodiments, the adjacent flat tubes may be connected by flange welding. The adjacent flat tubes 1 may also be connected by any other feasible ways, such as adhesive bonding, snap-fit connection, etc.

In some embodiments, a bottom of the heater located in the upper portion of the flat tube 1 may be disposed with an installation structure that matches the side inner insulation component 33. In some embodiments, the installation structure may include ribs and recesses. An upper end of the side inner insulation component 33 may have ribs (as shown in FIG. 3), and the corresponding position of the heater located in the upper portion of the flat tube 1 may have recesses to achieve a matching installation with the side inner insulation component 33. The installation structure may support the heater to prevent the heat on the upper portion of the flat tube from exerting a pressure on the flat tube 1.

In some embodiments, when the top plate of the flat tube is arched, the bottom of the heater located in the upper portion of the flat tube 1 may be designed as an arch to match the arched top plate of the flat tube, and the top of the heater may be flat.

Some embodiments of the present disclosure may also provide a method for adjustable heat dissipation in a channel cooling section. By designing the above mode for disassemble the device for heat dissipation on line, an online regulation of a heat dissipation capacity may be achieved. The method for adjustable heat dissipation in a channel cooling section may include the following operations.

A first disassembly may be performed on each of the flat tubes 1 one by one in sequence. The first disassembly may include loosening the side clamping components 32 at both ends of the side inner insulation component 33, removing the top insulation component 51 and the side outer insulation component 31 of the flat tube 1 in sequence, and then fixing the side clamping components 32 again, to realize a first disassembly heat dissipation of the cooling section.

In some embodiments, after the first disassembly, if a heat dissipation requirement is not satisfied, a second disassembly may be performed on each of the flat tubes 1 one by one in sequence. The second disassembly may include loosening the side clamping components 32 at both ends of the side inner insulation component 33, removing the side inner insulation component 33 of the flat tube in sequence, to realize a second disassembly heat dissipation of the channel cooling section.

The method for adjustable heat dissipation of some embodiments of the present disclosure may have two heat dissipation levels respectively satisfying the heat dissipation requirements with different flow requirements, which do not impact a stability of the processing, etc. Specifically, the method may include two disassembly operations. With an insulation structure whose parts are designed to be removable, each time a portion of the parts is disassembled, a certain heat dissipation may be achieved accordingly. In combination with a power adjustment of a peripheral ring heater of the cooling section of the flat tube 1, a higher level of heat dissipation may be guaranteed. At the same time, there may be no risk of uncontrolled heat dissipation due to a too-low heater power, thereby ensuring a normal operation of the channel cooling section. The operation may be simple and practical.

The operations for installing and adjusting the exemplary embodiment may be as follows.

In an actual initial installation process, the side insulation structure 3 and the top insulation structure 5 may be assembled according to the structure shown in FIG. 1. The side outer insulation component 31 and the side inner insulation component 33 may be directly fitted together without a need for adhesive refractory mortar, instead, they may be clamped on two sides of an outer surface of the side outer insulation component 31 by an external mechanical structure alone. As for the side clamping component 32, a fixed mechanical structure may be used for clamping and fixing, and the side clamping component 32 may usually not disassembled. Similarly, the top insulation structure 5 may be fixed using the embossed brick 6 to act directly on a top clamping surface component, so as to fix a butt joint. A middle top insulation component 51 may be directly disposed on the top without clamping. The above arrangement may be an initial masonry state.

In some embodiments, the disassembly process may be mainly carried out during the production process. Due to process adjustments such as improving the flow, etc., when a cooling capacity of the cooling section is insufficient, the first disassembly may be performed. That is, the flat tube 1 in the cooling section may be disassembled section by section. The top insulation component 51 and the side outer insulation component 31 in each section may be successively disassembled. Compared with the direct disassembly of the top, to disassemble the side, first the clamping component of the side outer insulation component 31 may be loosened. After removing the side outer insulation component 31, the clamping component may be fixed again, thereby achieving the first disassembly to improve the heat dissipation.

In some embodiments, the second disassembly may be carried out when the first disassembly still does meet the heat dissipation requirement. When the flow is higher, the side inner insulation component 33 may be also disassembled. The process may be the same as the above-described process for disassembling the side outer insulation component 31. That is, the flat tube 1 in the cooling section may be disassembled section by section, and the side inner insulation component 33 in each section may be successively disassembled. The clamping component of the side inner insulation component 33 may be loosened first, and after disassembling the side inner insulation component 33, the clamping component may be fixed again. Therefore, the second disassembly may be achieved to improve the heat dissipation.

In the device for adjustable heat dissipation in the channel cooling section of some embodiments of the present disclosure, combining heat dissipation plans implemented according to different flows, an equivalent heat dissipation matching may be realized. Furthermore, the above process allows for a reverse operation, that is, the heat dissipation may be reduced to match a decreased flow. In practical applications, the first disassembly heat dissipation above may be increased by 6%, and the second disassembly heat dissipation may be increased by 14%. In this way, the adjustment of the flow from 650 kg/h to 800 kg/h may be implemented.

In certain embodiments, a serrated or wave-shaped heat dissipation cavity may be formed between the side inner insulation component 33 and the side heater 2. One end of the heat dissipation cavity may allow air to enter, while the other end may allow the air to be pumped out. A flow of air may carry away a heat energy, thereby enhancing the heat dissipation effect.

In certain embodiments, a plurality of cooling pipes may be disposed between the side inner insulation component 33 and the side heater 2. The air may enter the plurality of cooling pipes to carry away heat and further enhance the heat dissipation effect. In some embodiments, the plurality of the cooling pipes may come into contact with the side heater 2. After removing the side inner insulation component 33 in the second disassembly, the plurality of the cooling pipes may help to further perform the heat dissipation on the side heater 2. By dissipating heat from the side heater 2, a too rapid cooling of the flat tube 1 after the removal of the side inner insulation component 33 may be avoided, thereby avoiding possible adverse consequences brought by the too rapid cooling.

In some embodiments, the device for heat dissipation may further include a processor. The processor may be used to process data related to a functioning of the device for heat dissipation, an exemplary processor may include a central processing unit (CPU), an application-specific integrated circuit (ASIC), and a controller, etc. In some embodiments, the processor may be configured to: obtain a target flow value; predict a sequence of heat dissipation temperature for a glass melt to pass through the cooling section at the target flow value; determine, based on the sequence of heat dissipation temperature, a target parameter set; and determine, based on the target parameter set, whether or not to perform the first disassembly or, alternatively, whether or not to perform the first disassembly and the second disassembly.

The target flow value refers to a flow value of the glass melt through the cooling section set according to a process requirement. The target flow value may be pre-set empirically.

The sequence of heat dissipation temperature refers to a sequence consisting of temperatures of a plurality of moments during a process of the glass melt passing through the cooling section at the target flow value. The plurality of moments may include any moment from the glass melt entering the cooling section to the glass melt flowing out of the cooling section. A time interval between each adjacent two moments may be equal.

In some embodiments, the sequence of heat dissipation temperature may be determined based on various feasible means, such as establishing a table of relationship between the target flow value and the corresponding sequence of heat dissipation temperature based on historical data, and determining the sequence of heat dissipation temperature by checking the table.

In some embodiments, the sequence of heat dissipation temperature may be determined by a prediction model. The prediction model may be a machine learning model, such as at least one of a neural network model or a convolutional neural network model, etc. In some embodiments, the processor may determine the sequence of heat dissipation temperature based on the target flow value, an initial temperature of the glass melt, and a candidate parameter set, using the prediction model.

The initial temperature of the glass melt refers to the temperature of the glass melt as the glass melt flows into the cooling section. In some embodiments, a first temperature sensor may be provided in the device for heat dissipation. The first temperature sensor may be communicatively connected to a processor, and the processor may obtain the initial temperature of the glass melt through the first temperature sensor.

The candidate parameter set refers to a collection of data including the parameter related to whether or not to disassemble the insulation structure. The processor may generate a great number of sets of candidate parameters randomly. In some embodiments, each candidate parameter set may include a candidate disassembly parameter distribution and a candidate heating parameter distribution. The candidate disassembly parameter distribution may include a candidate disassembly parameter for each section of the flat tube 1, and the each section of the flat tube 1 may have three candidate disassembly parameter values, i.e., not disassembling any component, disassembling the top insulation component 51 and the side outer insulation component 31 (corresponding to performing the first disassembly), and disassembling the top insulation component 51, the side outer insulation component 31, and the side inner insulation component 33 (corresponding to performing the first disassembly and the second disassembly). The candidate heating parameter distribution may include a candidate heating parameter for each section of the flat tube 1. The candidate heating parameter for the each section of the flat tube 1 may include the power of the heater corresponding to each section of the flat tube 1. It may be understood that the insulation structure and the heater corresponding to each section of the flat tube 1 may be considered as a module mentioned above, and the processor may control each module independently.

In some embodiments, an input to the prediction model may include the target flow value, the initial temperature of the glass melt, and the candidate parameter set, and an output of the prediction model may be the sequence of heat dissipation temperature.

In some embodiments, the prediction model may be trained by a plurality of first training samples with first labels. The plurality of first training samples with the first labels may be input to an initial prediction model, a loss function may be constructed based on the first labels and results of the initial prediction model, and the parameters of the initial prediction model may be iteratively updated based on the loss function. The model training may be completed when the loss function of the initial prediction model satisfies a preset condition, and a trained prediction model may be obtained. The preset condition may be a convergence of the loss function, a number of iterations reaching a threshold, etc.

In some embodiments, the first training sample may include a historical flow value, a historical initial temperature of the glass melt, and a historical parameter set. The first label may be a sequence of actual temperatures of the glass melt passing through the cooling section under the condition of the first training sample. The first training sample and the first label may be obtained based on the historical data of the device for heat dissipation. The first label may be manually annotated.

In some embodiments, through the prediction model, the heat dissipation temperature of the glass melt through the cooling section may be quickly and more accurately predicted.

In some embodiments, the prediction model may output the sequence of heat dissipation temperature of the glass melt through the cooling section under the condition of each candidate parameter set separately.

In some embodiments, the processor may screen out the candidate parameter set that does not satisfy a cooling requirement, and for the remaining candidate parameter sets that satisfy the cooling requirement, their corresponding disassembly ease may be calculated, and the candidate parameter set with the highest disassembly ease may be determined as the target parameter set.

The cooling requirement refers to the requirement set for the heat dissipation of the device for heat dissipation, and the cooling requirement may be determined according to an actual production requirement.

In some embodiments, the cooling requirement may be the requirement for an absolute value of the temperature. For example, in the sequence of heat dissipation temperature, the temperature of the glass melt at the moment it flows out of the cooling section may need to be less than a first set value; or for example, the temperature of the glass melt at a specified moment in the sequence of heat dissipation temperature may need to be less than a second set value. The first set value and the second set value may be preset.

In some embodiments, the cooling requirement may be the requirement for a rate of temperature change. For example, in the sequence of heat dissipation temperature, the absolute value of a difference between the temperatures of the glass melt at any two neighboring moments needs to be within a first set range. For another example, in the sequence of heat dissipation temperature, the absolute value of the difference between the temperatures of the glass melt at two non-adjacent moments needs to be within a second set range, the second set range may be related to a time distance between the two non-adjacent moments, such as the greater the time distance, the greater the second set range, etc. The first set range and the second set range may be preset.

In some embodiments, the processor may match the sequence of heat dissipation temperature output by the prediction model with the cooling requirement, and exclude the candidate parameter set corresponding to the sequence of heat dissipation temperature that does not satisfy the cooling requirement.

The disassembly ease refers to the ease of removing the insulation structure. The disassembly ease may be calculated by the candidate parameter set.

For example, the candidate parameter set satisfying the cooling requirement may include a candidate parameter set A and a candidate parameter set B. The candidate parameter set A requires removing the top insulation component 51 and the side outer insulation component 31 of a 2-section flat tube, and the candidate parameter set B requires removing the top insulation component 51 and the side outer insulation component 31 of a 3-section flat tube. It may be obvious that the disassembly ease of the candidate parameter set A is greater than the disassembly ease of the candidate parameter set B. Therefore, the candidate parameter set A may be determined as the target parameter set.

An exemplary quantitative calculation mode for the exemplary disassembly ease may include: the disassembly ease=$k_1$/number of the flat tubes that need to be removed from the insulation structure+$k_2$/number of the insulation structures that need to be removed+$k_3$/average distance between the flat tubes that need to be removed from the insulation structure.

The number of the flat tubes that need to be removed from the insulation structure refers to the number of the flat tubes 1 involved in the disassembly of the insulation structure; and the number of the insulation structures that need to be removed refers to a total number of the top insulation components 51, the side outer insulation components 31, and the side inner insulation components 33 that need to be removed.

It may be understood that it is easier to remove the insulation structure of the adjacent flat tubes 1 than the insulation structure of the flat tubes 1 that are spaced farther apart, so the average distance between the flat tubes from which the insulation structures need to be removed is used as one of the considerations for the disassembly ease.

The average distance between the flat tubes that need to be removed from the insulation structure may be an average value. For example, if the flat tubes that need to be removed from the insulation structure includes a flat tube α, a flat tube β, and a flat tube γ, the between the flat tubes that need to be removed from the insulation structure=(distance between the flat tube α and the flat tube β+distance between the flat tube β and the flat tube γ+distance between the flat tube α and the flat tube γ)/3.

In some embodiments, based on the target parameter set, the heating parameter and the disassembly parameter for each section of the flat tube 1 may be determined. That is, the power of the heater of each section of the flat tube 1 may be determined, and whether to disassemble the insulation structure may be determined. At the same time, whether to carry out a single disassembly (disassembly of the top insulation component 51 and the side outer insulation component 31) or to carry out the first disassembly and the second disassembly (disassembly of the top insulation component 51, the side outer insulation component 31, and the side inner insulation component 33) when the insulation structure needs to be disassembled may be determined.

In some embodiments of the present disclosure, by predicting the cooling effect of different parameter sets for cooling the glass melt at a target flow rate, the parameter sets that are convenient for disassembly and with good cooling effects may be taken as the final target parameters for configuring the cooling section.

In some embodiments, the input to the prediction model may also include a flat tube stabilization temperature. The flat tube stabilization temperature refers to the temperature of the flat tube after the glass melt passes through the cooling section at a steady flow rate and undergoes a certain period of time. In some embodiments, a second temperature sensor may be provided between the side inner insulation component 33 and the flat tube 1. The second temperature sensor may be communicatively connected to the processor, and the processor may obtain the flat tube stabilization temperature through the second temperature sensor.

It may be understood that an ambient temperature of the glass melt is the temperature of the flat tube 1 directly contacts the glass melt, and thus by inputting the flat tube cooling temperature into the prediction model, an influence of the ambient temperature may be fully considered, and the prediction accuracy of the prediction model may be improved.

In some embodiments, the input to the prediction model may also include a glass melt residual rate for each section of the flat tube 1. The glass melt residual rate refers to a ratio of a volume of remained glass melt to a unit volume when the unit volume of the glass melt passes through the flat tube. The unit volume refers to a volume of each section of the flat tube.

The glass melt residual rate may be related to a material of an inner wall of the flat tube 1, a composition of the glass melt, and the temperature. The processor may obtain test data obtained from tests conducted under the same condition as a current glass melt residual rate for each section of the flat tube 1. The test data may be input to the processor manually through a control terminal communicatively connected to the processor. The control terminal refers to a terminal or software used by a user, such as an app, a smartphone, an operation panel, etc. The user may interact with the device for heat dissipation through the control terminal. For example, the control terminal may display information and the user may input information through the control terminal.

It may be understood that there is a difference in the temperature of the glass melt inside each section of the flat tube 1. When the glass melt passes through each section of the flat tube 1, a fluidity of the glass melt at an edge that is in direct contact with the flat tube 1 may be weaker than the fluidity of the glass melt at a center of the flat tube 1. The difference in fluidity may affect a heat transfer and a heat dissipation of the glass melt inside the flat tube 1. Therefore, the glass melt inside the flat tube may not be directly considered as a whole, and the difference in fluidity may be considered. Given this, the glass melt residual rate may be used as an indicator reflecting the difference in fluidity. The glass melt residual rate may be taken as the input to the prediction model to make the prediction result more accurate.

In some embodiments, the device for heat dissipation further may further include a position sensor, which is communicatively connected to the processor. The processor may be further configured to send the target parameter set to the control terminal. The control terminal may generate a disassembly prompt based on the target parameter set, and display the disassembly prompt to the user. In response to receiving disassembly completion information from the control terminal, the processor may verify whether the disassembly is completed based on the data obtained by the position sensor; and, in response to the disassembly not being completed, the processor may send position information of the flat tube whose disassembly is not been completed to the control terminal.

The disassembly prompt refers to information that prompts the user that the disassembly is required. For example, the disassembly prompt may be "a first disassembly is required", etc. In some embodiments, the disassembly prompt may be generated based on the target parameter set, and the disassembly prompt may be displayed on the control terminal.

The position sensor may be used to detect a position of an object. In some embodiments, the position sensor may include a first position sensor and a second position sensor. The first position sensor may be disposed on the flat tube 1, and the processor may obtain the position information of each section of the flat tube 1 through the position sensor. The second position sensor may be disposed on the insulation structure (e.g., the top insulation component 51, the side outer insulation component 31, and the side inner insulation component 33, etc.). When the insulation structure is disassembled, the second position sensor may also be disassembled, thereby allowing a determination of whether the insulation structure is disassembled based on the second position sensor. It is noted that there may be a plurality of second position sensors, and the plurality of the second position sensors may be respectively disposed on different components of the insulation structure. For example, one or more second position sensors may be disposed on the top insulation component 51, and one or more the second position sensors may be disposed on the side outer insulation component 31, etc. In this way, whether different components of the insulation structure are disassembled may be determined based on the second position sensors.

In some embodiments, the user may perform corresponding feedback operations based on the disassembly prompt, such as perform the first disassembly based on the disassembly prompt "a first disassembly is required". After the disassembly is completed, the user may input the disassembly completion information (such as "the first disassembly is completed") to the control terminal. The processor, upon receiving the disassembly completion information, may determine whether the corresponding components of the insulation structure (such as the top insulation component 51 and the side outer insulation component 31) have been disassembled based on the second position sensor. In some embodiments, if the processor determines, based on the second position sensor, that the corresponding components of the insulation structure have not been disassembled, the processor may send the position information of the flat tube 1 that has not been fully disassembled to the control terminal, display the position information to the user, and prompt the user to perform corresponding processing.

In some embodiments of the present disclosure, whether the disassembly is completed may be determined based on the position sensor, and the position of the incomplete disassembly may be displayed to the user. The user may perform a targeted processing according to the prompts, so as to effectively improve a processing efficiency.

In some embodiments, the disassembly may include a manual disassembly and an automatic disassembly. The device for heat dissipation may include an automatic disassembly device configured to automatically perform the first disassembly and the second disassembly of the device for heat dissipation. The automatic disassembly device may disassemble at least one of the top insulation component 51, the side outer insulation component 31, and the side inner insulation component 33. In some embodiments, the automatic disassembly device may include a plurality of mechanical arms. The device for heat dissipation may be automatically disassembled by the automatic disassembly device, thereby achieving an automatic heat dissipation of the device for heat dissipation, and improving efficiency.

The basic concepts have been described above, and it is apparent that to those skilled in the art, the above detailed disclosure is intended only as an example and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment", "the embodiment", and/or "some embodiments" are meant to refer to a certain feature, structure, or characteristic associated with at least one embodiment of the present disclosure. Accordingly, it should be emphasized and noted that "an embodiment" or "the embodiment" or "an alternative embodiment" mentioned two or more times in different places in the present disclosure do not necessarily refer to the same embodiment. In addition, certain features, structures, or characteristics in one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. Although a number of embodiments of the invention currently considered useful are discussed in the above disclosure by way of various examples, it should be understood that such details serve illustrative purposes only, and that additional claims are not limited to the disclosed embodiments. Rather, the claims are intended to cover all amendments and equivalent combinations that are consistent with the substance and scope of the embodiments of the present disclosure. For example, although the various components described above may be implemented through hardware devices, they may also be implemented solely through software solutions, such as installing the system described on existing servers or mobile devices.

Similarly, it should be noted that, in order to simplify the disclosure in the present disclosure and aid in the understanding of one or more embodiments of the present disclosure, the preceding description of embodiments in the present disclosure sometimes may combine multiple features into a single embodiment, accompanying drawings, or descriptions thereof. However, this method of disclosure does not imply that the objects of the present disclosure require more features than those mentioned in the claims. Rather, the claimed subject matter may include more than all the features of a single embodiment disclosed above.

Some embodiments use numeric values to describe the number of components or attributes, and it should be understood that such numeric values used in the description of the embodiments are sometimes modified with qualifiers such as "about," "approximately," or "substantially." Unless otherwise stated, the use of "about," "approximately," or "generally" indicates that a variation of ±20% is allowed for the specified numeric values. Accordingly, in some embodiments, the numeric parameters used in the disclosure and claims are approximate values that vary based on the specific characteristics desired for individual embodiments. In some embodiments, the numeric parameters should consider the specified number of significant figures and adopt a general digit reservation. Although the numeric ranges and parameters used to define the breadth of the ranges in some embodiments of the present disclosure are approximate, these values are set as accurately as possible in specific embodiments.

With regard to each patent, patent application, patent application disclosure, and other materials, such as articles, books, disclosures, publications, documents, etc., referenced in the present disclosure, their entire contents are hereby incorporated into the present disclosure as references. Excluded from those in history documents that are inconsistent with or create conflicts with the contents of the present disclosure, as well as documents (currently or later appended to the present disclosure) that limit the broadest scope of the claims in the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

Finally, it should be understood that the embodiments described in the present disclosure are for the purpose of illustrating the principles of the embodiments in the present disclosure. Other variations may also be within the scope of the present disclosure. Accordingly, as examples and not limitations, alternative configurations of the embodiments of the present disclosure may be considered consistent with the teachings of the present disclosure. Accordingly, the embodiments of the present disclosure are not limited to the embodiments expressly introduced and described herein.

What is claimed is:

1. A method for heat dissipation of a device for adjustable heat dissipation in a channel cooling section, wherein the method includes:
    performing a first disassembly on each of flat tubes one by one in sequence, the first disassembly including loosening side clamping components at both ends of a side inner insulation component, removing a top insulation component and a side outer insulation component of the flat tube in sequence, and then fixing the side clamping components again, to realize a first disassembly heat dissipation of the channel cooling section; and
    the device for adjustable heat dissipation in the channel cooling section includes:
    a plurality of flat tubes arranged adjacent to each other inside the channel cooling section, wherein each of the flat tubes is surrounded by a heater on an outer ring, a side insulation structure is provided on both sides of each of the flat tubes, and a top insulation structure is provided at a top of each of the flat tubes; wherein
        the side insulation structure includes the side outer insulation component, the side clamping components, and a side inner insulation component, one side of the side inner insulation component being matched and fitted to a side of the flat tube, the other side of the side inner insulation component being fitted to the side outer insulation component, and the side clamping components being provided at each of two ends of the side inner insulation component; and the top insulation structure includes a top insulation component disposed at a top of the flat tube, and top clamping components disposed at each of two ends of the top insulation component.

2. The method for heat dissipation of the device for adjustable heat dissipation in the channel cooling section of claim 1, wherein a butt joint disposed with an embossed brick is left between the top clamping components at a top of two adjacent flat tubes.

3. The method for heat dissipation of the device for adjustable heat dissipation in the channel cooling section of claim 1, wherein the flat tube includes a flat tube top plate and a flat tube bottom plate, the flat tube top plate being arched, the flat tube bottom plate being a flat plate with both sides being bent upwardly and welded to the flat tube top plate to form the flat tube.

4. The method for heat dissipation of the device for adjustable heat dissipation in the channel cooling section of claim 3, wherein the side inner insulation component, the side outer insulation component and the side clamping component are spliced to form a U-shape structure, a curvature of the U-shape structure being matched with a curvature of both sides of the flat tube.

5. The method for heat dissipation of the device for adjustable heat dissipation in the channel cooling section of claim 1, wherein the adjacent flat tubes are connected by flange welding.

6. The method for heat dissipation of the device for adjustable heat dissipation in the channel cooling section of claim 1, wherein the top insulation structure is a flat plate structure.

7. The method for heat dissipation of the device for adjustable heat dissipation in the channel cooling section of claim 1, wherein the side insulation structure and the top insulation structure both adopt high alumina heat insulation bricks.

8. The method for heat dissipation of the device for adjustable heat dissipation in the channel cooling section of claim 1, wherein after the first disassembly, if a heat dissipation requirement is not satisfied, a second disassembly is performed on each of the flat tubes one by one in sequence, the second disassembly including loosening the side clamping components at the both ends of the side inner insulation component, removing the side inner insulation component of the flat tube in sequence, to realize a second disassembly heat dissipation of the channel cooling section.

* * * * *